United States Patent [19]

Graton et al.

[11] Patent Number: 4,860,871
[45] Date of Patent: Aug. 29, 1989

[54] CLUTCH FRICTION DISC WITH PREDAMPER

[75] Inventors: Michel Graton, Paris; Alain Jochun, Levallois-Perret, all of France

[73] Assignee: Valeo, Paris, France

[21] Appl. No.: 156,977

[22] Filed: Feb. 18, 1988

[30] Foreign Application Priority Data

Feb. 24, 1987 [FR] France ............... 87 02396

[51] Int. Cl.$^4$ .............................................. F16D 3/14
[52] U.S. Cl. ...................... 192/106.1; 192/106.2; 464/68
[58] Field of Search ................... 192/106.1, 106.2; 464/68

[56] References Cited

U.S. PATENT DOCUMENTS

| | | | |
|---|---|---|---|
| 4,223,776 | 9/1980 | Berlioux | 192/106.1 |
| 4,574,932 | 3/1986 | Despres | 192/106.2 |
| 4,586,595 | 5/1986 | Hartig et al. | 192/106.2 |
| 4,603,767 | 8/1986 | Blond | 192/106.2 |
| 4,688,666 | 8/1987 | Blond | 192/106.2 |
| 4,700,822 | 10/1987 | Maucher et al. | 192/106.2 |

FOREIGN PATENT DOCUMENTS 2167527 5/1986 United Kingdom ............... 464/68
2181817 4/1987 United Kingdom .

*Primary Examiner*—Leslie A. Braun
*Assistant Examiner*—David A. Testard
*Attorney, Agent, or Firm*—Charles E. Brown; Charles A. Brown

[57] ABSTRACT

A clutch friction disc has a hub and a support for friction linings which are mounted for limited relative angular movement. Two torsion damping devices control said angular movement, comprising a predamper and a stronger principal damper. The predamper comprises an annular plate equipped with displacement springs between two guiding washers and for axial connection between these washers there are provided elastic tongues originating from one of the plates and arranged to clip onto the other, these clipping tongues passing radially to the outside of the annular plate and alternating around the periphery with spacing lugs. These clipping tongues serve only for the preassembly of the predamper and subassembly in which there is also incorporated a spring for damping the oscillations of the predamper.

5 Claims, 3 Drawing Sheets

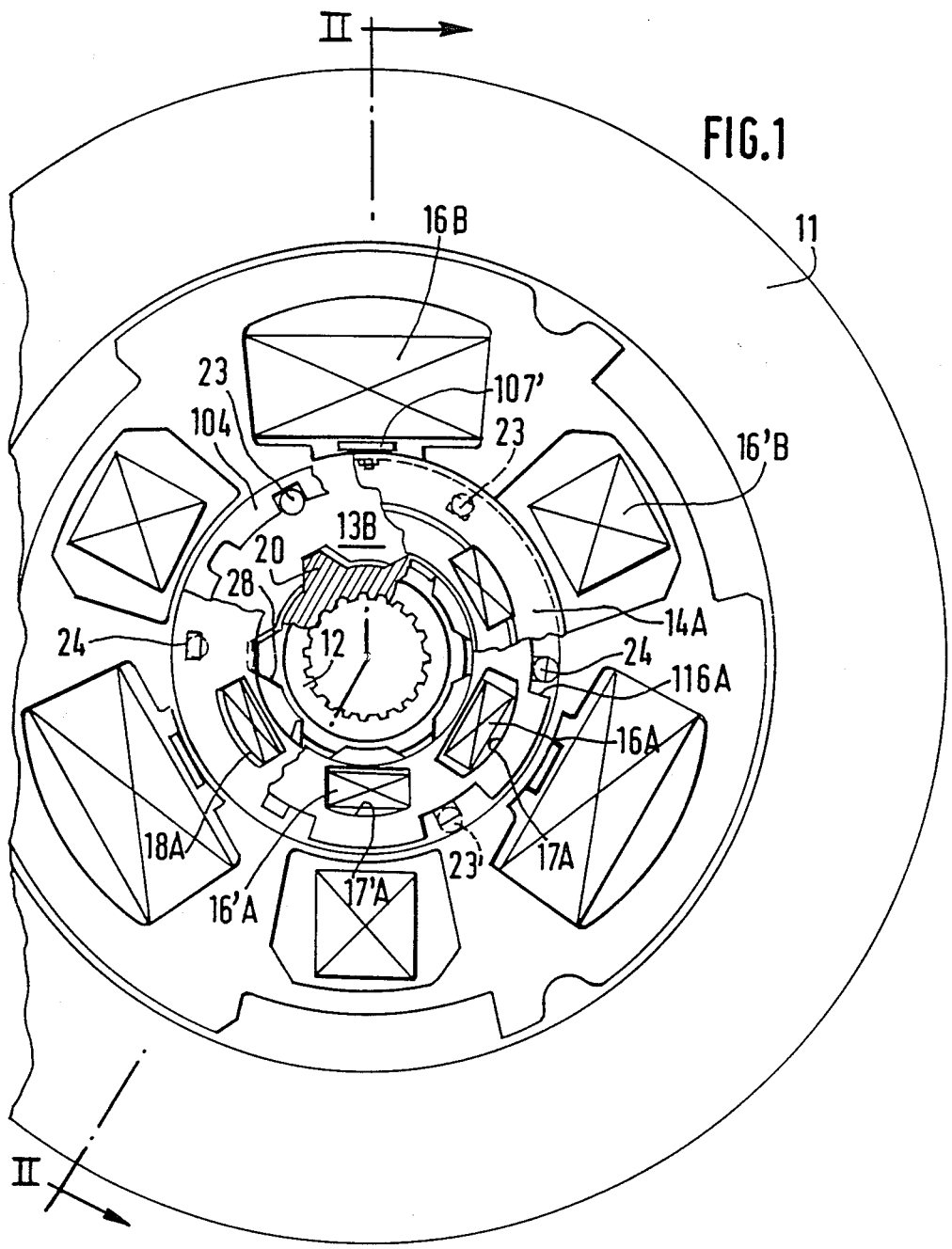

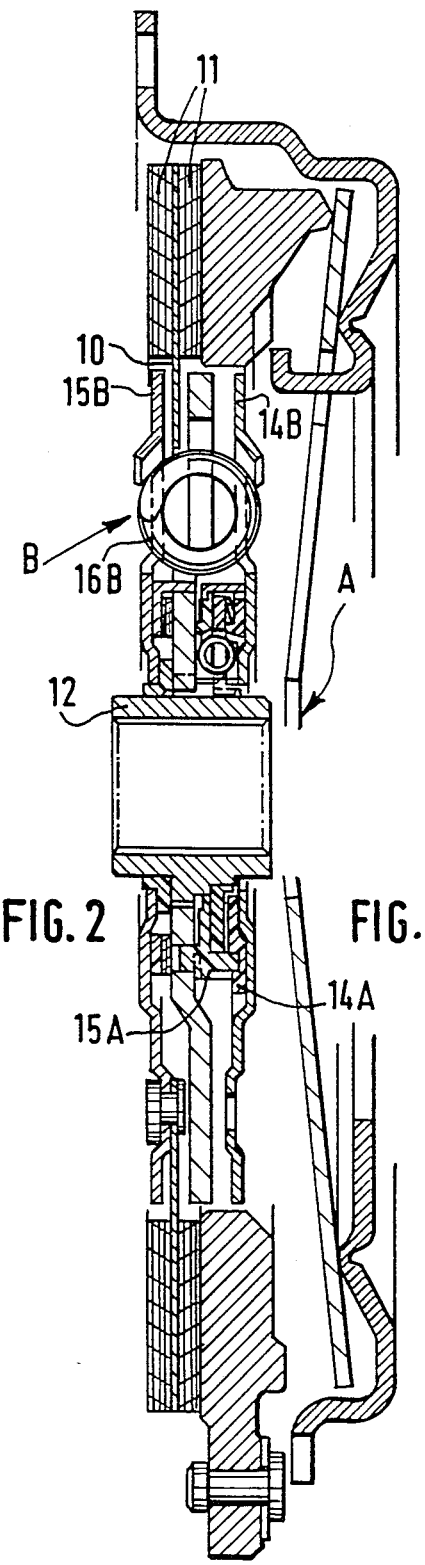
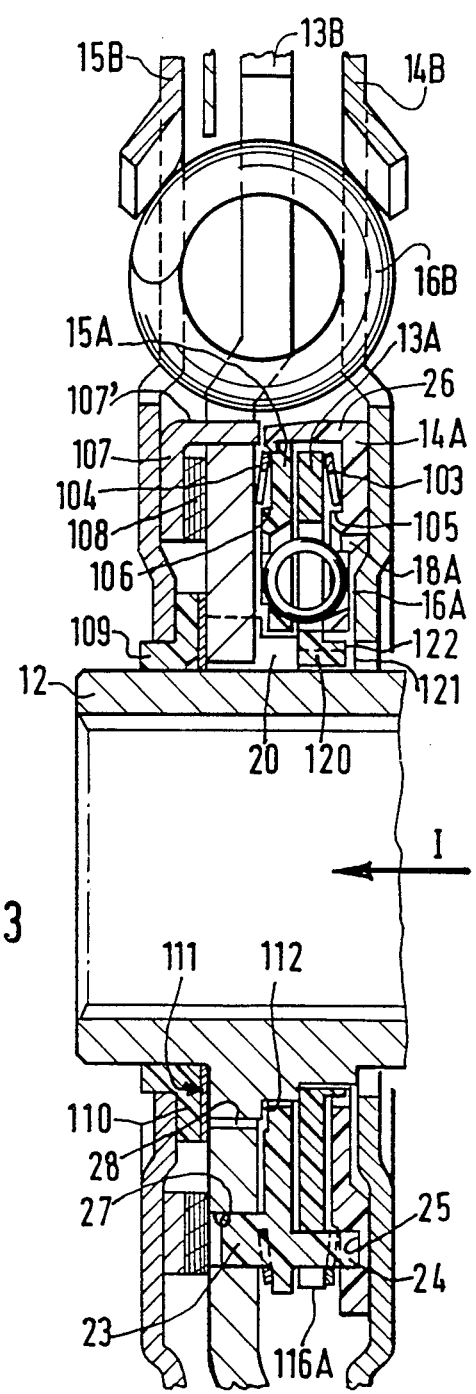

CLUTCH FRICTION DISC WITH PREDAMPER

BACKGROUND OF THE INVENTION

1. Field of the Invention

The present invention relates to a clutch friction disc of the kind comprising a support for friction linings, and a hub, which are angularly movable with respect to one another within predetermined limits, the support and the hub being connected by two torsion damping devices, which act in stages, one of which, the first or predamper, being weaker than the second or principal damper. Each of these devices comprise an annular plate, two guiding washers integral with one another and disposed axially on either side of the annular plate, and elastic means for controlling angular movement interposed circumferentially between the annular plate and the washers; as with the associated friction means, the annular plate of the predamper is integral in rotation with the hub, whilst its guiding washers are integral in rotation with the annular plate of the principal damper which is mounted on the hub with a clearance allowing the said fixed angular displacement between the guiding washers integral with the support for the friction linings.

2. Description of the related art

In U.S. Pat. No. 4,603,767 a clutch friction disc of this kind is described in which the predamper is preferably located in the centre of the principal damper between the annular plate and one of the guiding washers. The friction means associated with the predamper comprise a friction washer and a balancing elastic means determining the force of compression between the annular plate and guiding washer; a similar arrangement is also provided in the centre of the principal damper.

It has also been suggested, particularly in French patent No. 2,573,830, that predampers consisting of parts moulded in plastic should be used as friction or sliding surfaces. However, these forms still present definite disadvantages which limit the possibilities of developing them in practice. For instance, the structure of the annular plate of the predamper is considerably weakened by the openings required for the means to fix the guiding washers permanently to one another, and as the friction damping means are all disposed outside the predamper, distributed on both sides of the annular plate of the principal damper, thus introducing multiple elements of friction and balancing, this complicates the construction of the friction disc.

The friction linings of the predamper are also brought into action without the principal damper functioning, which entails a risk of accelerated wear of these surfaces. Moreover, the elastic balancing means act equally at the same time on the friction linings of the predamper and of the principal damper which gives rise to a difficulty in precise regulation of the various frictional effects. In addition, in the absence of automatic compensation for wear, after a certain period of use there is a risk of damping means of the predamper not being in equilibrium with the damping means of the principal damper.

The present invention overcomes these advantages and also permits easier assembly.

SUMMARY OF THE INVENTION

The invention proposes, in a friction disc of the kind discussed, a predamper in which one of the guiding washers, has, projecting axially, a plurality of spacing lugs which fit into holes made for this purpose in the other of the said guiding washers and, to provide axial connection between these washers, elastic tongues extend from one of said washers and hook onto the other, said spacing lugs, and said elastic tongues passing radially to the outside of the annular plate of the predamper and alternating around its periphery.

As a result of this arrangement, great robustness can be conferred on the predamper and in particular on its annular plate, whilst creating the possibility of housing the desired number of movement springs in order to improve the damping performances.

The spacing lugs can preferably alternate around the periphery of the annular plate with the sites of the windows for housing the springs which control angular movement.

In addition, the proposed structure allows incorporation in the centre of the predamper of friction and balancing means which are preferably integrated, in an embodiment of the invention, in a single piece, such as a Belleville washer or a corrugated washer, confined under an elastic constraint between the annular plate and one of the guiding washers of the predamper.

In another preferred embodiment of the invention, also associated with the predamper assembly, is the means of balancing the frictional forces in the centre of the principal damper, this means being disposed on the outside of the predamper facing the annular plate of the principal damper.

BRIEF DESCRIPTION OF THE DRAWINGS

FIG. 1 is, with parts removed, a partial view in elevation of a clutch friction disc according to the invention in the direction of the arrow I of FIG. 3;

FIG. 2 is a view in axial section, along the broken line II—II of FIG. 1;

FIG. 3 is a partial enlargement of FIG. 2; and

DESCRIPTION OF THE PREFERRED EMBODIMENTS

Figure 4:
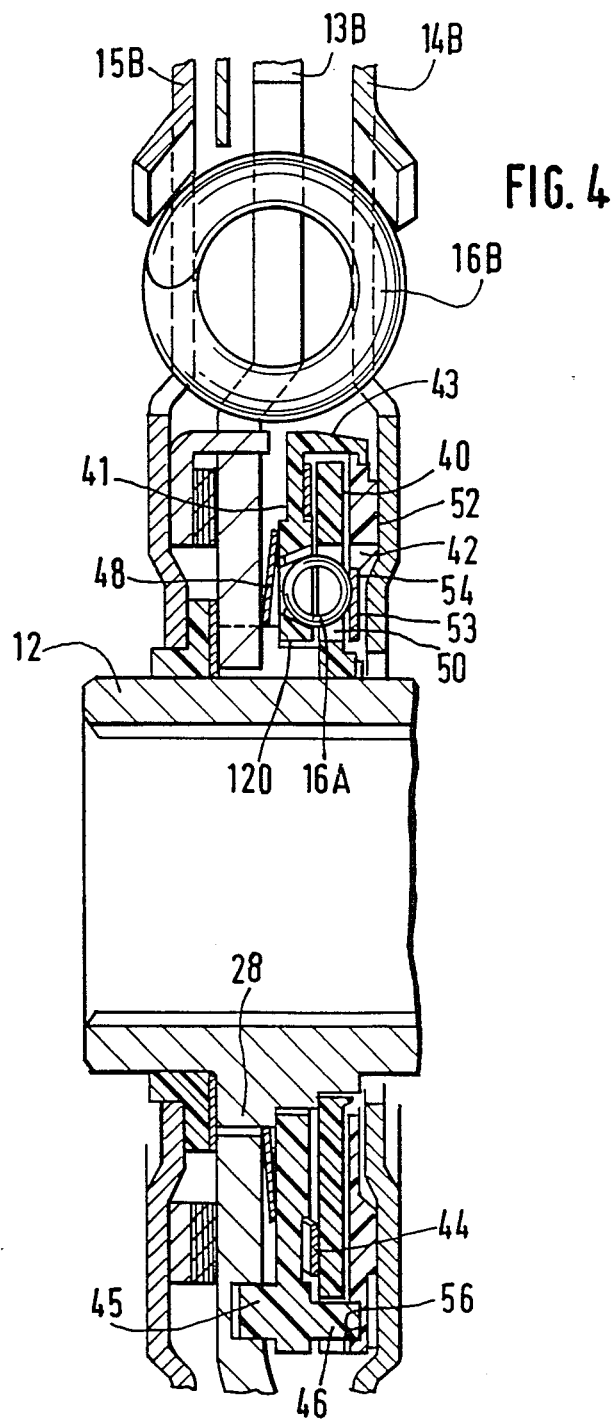
FIG. 4 is a similar view to FIG. 3 but of another embodiment.

In the embodiment shown in FIGS. 1 to 3, a clutch friction disc comprises a support 10 for friction linings 11, and a hub 12. The support and the hub are angularly movable with respect of one another within pre-determined limits, and are coupled by two torsion damping devices, with action in steps, one of which (A), referred to as the first device or pre-damper, is weaker than the other (B), referred to as the second device or principal damper. Altogether, this clutch friction disc, which is in practice intended to equip an automobile, is intended to be gripped in known manner by the friction linings 11, between two friction plates, integrally in rotation with a first shaft, in practice the engine crank-shaft, whilst by its hub 12, it is fixed in rotation with a second shaft, in practice the input shaft to the gear-box.

The predamper A comprises an annular plate 13A which, according to the methods described in more detail hereinafter, is integral in rotation with the hub 12; two guiding washers 14A, 15A, which, free in relation to the hub 12, are respectively disposed axially on either side of the annular plate 13A whilst being permanently fixed to one another; elastic means 16A, 16A which are interposed circumferentially between the annular plate 13A and the washers 14A, 15A, and friction means, which, depending on the methods also detailed later, are interposed axially between this annular plate 13A and the washers 14A, 15A.

The annular plate 13A and the washers 14A, 15A extend in all directions around a middle zone of hub 12.

At its outer periphery, the hub 12 has, projecting axially over part of its length, splines 20 which, opposite annular plate 13A, beyond a transverse shoulder 120, are radially reduced in height, and on its inner periphery the annular plate 13A itself has in a complementary manner splines 121 by which it is held, without play, to the portion with radially reduced height of the aforesaid splines.

The annular plate 13A in section is generally L-shaped. The annular plate 13A is thus integral with the hub 12 not only circumferentially but also in an axial direction; in effect its inner peripheral splined part 121 is joined by friction to the splines of the hub to the extent of axial abutment by one of its faces on the transverse shoulder 120.

One of the guiding washers 14A, 15A (here the washer 15A) is provided with a plurality of lugs 24 engaged in corresponding holes 25 of the other washer 14A. These lugs form spacers between the two washers and ensure their integrated rotation. The holes 25 here are blind holes. Elastic axially orientated lugs 26 stemming from the outer periphery of washer 14A are fixed by catching on the other washer 15A. They extend radially outside annular plate 13A, alternating with the lugs 24. The washer 15A closest to the principal annular plate 13B is likewise equipped with a plurality of studs 23 arranged to engage by sliding axially in the corresponding holes 27 of the said principal annular plate 13B. The lugs 24 here pass, with play, through notches 116A provided for this purpose at the periphery of annular plate 13A. They are preferably staggered radially towards the outside with respect to the coupling studs 23 with a sectional shape elongated in the peripheral direction.

The predamper A is in this embodiment provided with two sets of three elastic means 16A, 16'A, consisting of two groups of helicoidal springs with their axes disposed essentially tangentially to a uniform circumference of the assembly and individually housed in the windows 17A, 17'A respectively of the annular plate 13A between corresponding clearances, such as 18A, of the washers 14A and 15A which themselves delimit the extreme circumferential edges of the windows made in these washers 14A and 15A.

Finally, with regard to the associated friction means, these comprise an elastic balancing and friction means 103 situated between the annular plate 13A and the guiding washer 14A, by means of a clearance made for this purpose, with a shoulder 105, on the inner face of this guiding washer. These means 103 comprise a Belleville washer provided on its inner periphery with notches permitting the passage of lugs 24 which thus connect the washer 103 in rotation with the washers 15A, 14A. The second torsion damping device B comprises an annular plate 13B, of which the outline in axial section provides, opposite the guiding washer 14B, the space necessary to house predamper A. This clearance is provided here by a bend situated in the contact zone with the damping springs 16B, 16'B on the side which is radially inside, and so closest to hub 12. The annular plate 13B has on its inner periphery splines 28 which engage with the angular play prescribed with the splines 20 of hub 12. Two similar guiding washers 14B and 15B are disposed respectively on both sides of the annular plate 13B, surrounding the first device A, whilst both are made integral by usual means with support 10. These means can conventionally be small separate columns of rivets (not shown) fixing the disc 10 to the guiding washer 15B. Two groups of three elastic means 16B, 16'B are interposed circumferentially between the annular plate 13B and the adjacent washers 14B, 15B. A balancing washer 104 acts axially between the annular plate 13B and the adjacent guiding washer 15A. Here again this consists of a Belleville washer with cut-outs on its inner periphery for the studs 23 to pass through. To house this Belleville washer, on the washer 15A a clearance delimiting by a shoulder 106 is made on the face intended to seat it opposite annular plate 13B. The force exerted by this balancing washer 104 is greater than that exerted by balancing washer 103. The studs 23 ensure its connection in rotation with annular plate 13B.

In the space between the guiding washer 15B and the principal annular plate 13B is an application and friction washer 107 joined to a spacing washer 108 in contact with annular plate 13B, this washer 107 having axial lugs 107' engaged with play in the notches provided in the radially internal edges of the windows for housing the springs 16B in the annular plate 13B. A block 109 supports the inner edge of the washer 15B and is in contact with the hub. Between this block 109 and the annular plate 13B a friction washer 110, integral with the block 109, is interposed which acts on the transverse shoulder 111 of the channels 20. The axial retention of the device is ensured after permanently connecting the two guiding washers 14B and 15B (for example by means of small columns of rivets, which are not shown) by fitting the assembly between the shoulders 111 and 120. The principal annular plate 13B is driven in effect by balancing spring 104 towards the friction washer 110, whilst the annular plate 13A is driven towards the shoulder 111 by spring 103.

In other words, the radially projecting part of the hub 20, which is situated between the two shoulders 111 and 120, is imprisoned after assembly of the device between the block 109 on the one hand, and the annular plate 13A on the other hand.

It should also be emphasized that the preassembled unit consisting of the predamper is very easy to install. It suffices to put the annular plate 13A equipped with its two groups of springs 16A, 16'A on the guiding washer 14A provided with the spring 103, after which the guiding washer 15A carrying the spring 104 is put into place, in such a way that the lugs 24 penetrate into the holes 25 until the hooked ends of the clipping lugs 26 elastically jump over into place. In the assembly thus made the spring 103 is subjected to a certain prestress which determines the conditions of damping by friction of the oscillations in the centre of the predamper, the friction being produced in the zone of contact of the annular plate 13A and the washer 103.

Mounting of the assembly comprises the successive installation of the guiding washer 15B by threading its washer on the hub with a block 109, until its washer 110 abuts the shoulder 111, installation of the principal annular plate 13B bearing the two groups of springs 16B and 16'B and also the fixing washer 107, and finally the successive installation of the predamper unit until the annular plate 13A abuts against the shoulder 120, and of the second guiding washer 14B permanently fixing it in-situ to the other washer 15B in a customary way, for example by means of small columns of rivets (not shown in the drawings).

For harnessing in rotation with the principal damper, the predamper A presents studs 23 individually engaged in the holes 27 made for this purpose in the annular plate 13B. In practice six studs 23 are provided in this way disposed at 60° from one another.

In one preferred embodiment the studs 23, the lugs 24, and the guiding washer 15A constitute a single moulded piece. In the same way the elastic lugs 26 and the guiding washer 14A constitute a single moulded piece. These moulded pieces can be made of synthetic material such as plastic which may or may not be reinforced with fibres. At least one of the annular plates 13A and 13B can be made from sintered metal.

It can thus be seen that both the manufacture and installation of the device, and particularly the predamper, are simplified in a particularly advantageous and economic way, but notwithstanding this, the technical performance and the reliability of the system are maximised as a result of a thorough mastery of the conditions of damping by friction the oscillations which can develop in the centre of the predamper on the one hand, and of the principal damper on the other hand.

In addition this is obtained whilst making the predamper as solid as possible, and more particularly its annular plate, as a result of the fact that the spacing lugs 24 and the clipping tongues 26 are distributed at the periphery and around the annular plate, which has allowed, especially in the embodiment considered, housing of the two groups of three tangential displacement springs 16A, 16'A.

The alternative embodiment illustrated in FIG. 4, where the reference numbers already used above have been reused to indicate the unchanged parts of the device, is distinguished from the former in certain details relating only to the structure of the predamper.

Here again two guiding washers are disposed on both sides of an annular plate 40 of the predamper, an inner one 41 and an outer one 42 respectively.

The assembly is again made by clipping elastic tongues 43 distributed on the periphery, but in this case stemming from the inner washer 41. A balancing spring is disposed inside the predamper, consisting here of a corrugated washer 44 (of the ONDUFLEX type) likewise borne by the inner guiding washer 41 in a housing made for this purpose in the inner face, that is to say facing annular plate 40 and near the outer radial periphery of this plate. It is again the inner washer 41 which has, projecting axially, the studs 45 for coupling in rotation with the principal annular plate 13B and, the spacing lugs 46 engaged in blind holes 56 of the washer 52. The holes made in the principal annular plate 13B to receive the studs 45 are also in this case blind holes.

In place of the spring 104, is in this case a Belleville washer 48 is threaded onto the highest stage 28 of the teeth of the hub 12. The outer washer 42 has a continuous annular part 52 forming with respect to the washer 14B a friction track; on the radially inward side of annular part 52 there is a part with reduced thickness pierced by a plurality of windows 54 intended to cooperate with the windows 50 of the annular plate 40 to receive the tangential springs; and on the side radially outwards, there is a peripheral part comprising an alternation of catches 55 for hooking the clipping tongues 43 and blind holes 56 to receive the spacing lugs 46.

It will be seen that the spring 48 is centred here on the support provided for this purpose by the hub itself; its installation can thus immediately preceed that of the preassembled unit constituted by the predamper. The balancing spring is notched on its inner periphery and fixed in rotation with hub 12 by engagement of these notches with the teeth 28.

In all cases, the action of the clutch friction disc can be analysed as follows.

In the case of weak couples, for example in the neutral position of the gear box of an automobile, the resisting couple encountered by the hub 12 is close to zero, and the movement transmitted by the guiding washers 14B-15B passes almost directly to the annular plate 13B of the principal damper, the stiffness of the springs 16B 16'B being an order of magnitude greater than the forces occurring at this stage. Within the limits of the angular clearance made between the principal annular plate 13B and the hub 12, the movement is thus transmitted by the annular plate, through the studs 23 (or 45), to the guiding washers 14A, 15A which transmit it to the annular plate 13A (or 40) whilst compressing initially the least stiff springs 16A.

When the couple increases, after saturation of the springs 16A, it is the springs 16'A which intervene in their turn, the state of weak couples thus being treated in two successive stages.

During these first two stages the oscillations which can develop in the centre of the predamper are damped by the friction of the balancing spring 103 (or 44) against the annular plate and one of the guiding washers of the predamper.

More exactly, in the embodiment in FIG. 3, the friction is produced between the washer 103 and the annular plate 13A, whilst in the variant in FIG. 4 the corrugated washer 44, being bound to neither the one nor the other of the two pieces which surround it, the friction can be produced equally well on the annular plate 40 as on the adjacent guiding washer, an arrangement which may be preferred in certain applications.

After disappearance of the play between annular plate 13B and hub 12 the predamper, remaining compressed in the state in which it finds itself, ceases to act and the state of strong couples is reached.

In this state it is the springs of group 16B of lesser stiffness which are compressed increasingly as the couple to be transmitted increases. The oscillations which can tend to arise in the centre of the principal damper are damped by the friction, on the one hand of the annular plate on the friction washer 110, and on the other hand f the predamper, or more exactly of the outer washer 14A (or 42) of this in contact with the guiding washer 14B. Balancing of these frictions is performed by the Belleville washer 104 (FIG. 3) or 48 (FIG. 4).

From the time when the clearances of the springs of group 16B are taken up, the state with very strong couples is entered in which, finally, the springs 16'B with greatest stiffness come into play. From this moment, the lugs 107 are entrained by one of the edges of the notches made on the windows for housing the springs 16B in the annular plate 13B, and the washer 107 acts as third means of damping friction by the contact of the guiding washer 15B. In this state of very strong couples, the damping friction action is thus intensified as a result of the increase in the surfaces of friction, but always under the predetermined balancing action of the balancing means constituted by the Belleville washer 104 of FIG. 3 or 48 or FIG. 4.

In the case of diminution of the couple transmitted, the initial situation is arrived at again by a reversal of the path, and in the case of a reversal of the couple the change develops in a practically symmetrical manner but in the reverse direction.

However, as far as the application washer 107 is concerned, it is carried back in a known manner to its median position when the couple transmitted is removed because the spacing washer 108 which is associated with it for this purpose frictionally engages the adjacent face of annular plate 13B.

The invention is not limited to the embodiments discussed above, which are described by way of example only.

So far as the structure of the predamper is concerned, it is interesting to note that the only role of the clipping lugs 26, 43 is to facilitate assembly by allowing preassembly in a subassembly which constitutes a single element to install during the assembly of the principal damper, and once this assembly is effected the lugs cease to play any part in the action of the assembly.

It will also have been understood that because the power of the spring 104 is greater than that of the spring 103, the lugs 24 are driven back to the bottom of the blind holes 25 and a play appears with respect to the hooks of the lugs 26. In place of the blind holes 25, 56, in certain applications through holes may be preferred; in this case the spacing function will be ensured by means of a shoulder made for this purpose on the lugs 24 or 46 to engage at the opening of these holes.

In addition the coupling or spacing lugs 24 or 46 can be made independently of the coupling studs 45, and can be shifted circumferentially; also the number may be different.

What is claimed is:

1. A clutch friction disc of the kind comprising a support for friction linings and a hub which are angularly movable with respect to one another within predetermined limits, the support and the hub being coupled by two torsion damping devices which act in stages, the first device or predamper being weaker than the second device or principal damper, each of said devices comprising an annular plate, two guiding washers integral with one another and disposed axially on either side of the annular plate, and elastic means for controlling angular movement being interposed circumferentially between the annular plate and the washers, the annular plate of the predamper being integral in rotation with the hub, and the washers of the predamper being integral in rotation with the annular plate of the principal damper, and this principal annular plate being mounted on the hub with a clearance permitting a predetermined angular movement; and friction damping means comprising elastic means for balancing friction; wherein one of the guiding washers of the predamper is provided with a plurality of axially projecting spacing lugs which fit into corresponding holes in the other of the said guiding washers, and elastic tongues are provided for axial connection between the washers, said elastic tongues extending from one of said washers to hook onto the other of said washers, said spacing lugs and said elastic tongues passing radially to the outside of the annular plate of the predamper and alternating around the periphery thereof.

2. A friction disc according to claim 1, wherein the washer of the predamper being integral in rotation with the annular plate of the principal damper by means of coupling studs arranged to engage individually, axially in corresponding holes of the said annular plate of the principal damper and said spacing lugs are staggered radially towards the outside with respect to the coupling studs.

3. A friction disc according to claim 1, wherein said predamper is provided with friction and balancing means disposed between the annular plate and one of said guiding washers for damping the oscillations which can develop in the center of the predamper.

4. A friction disc according to claim 1, wherein said spacing lugs are formed on the guiding washer adjacent to the principal annular plate, whilst the elastic tongues are formed on the other guiding washer.

5. A friction disc according to claim 1, wherein the spacing lugs and the elastic tongues are formed on the guiding washer adjacent to the principal annular plate, and said principal annular plate is also provided with coupling studs rotatable therewith.

* * * * *